US012589406B2

(12) United States Patent
Narumi et al.

(10) Patent No.: US 12,589,406 B2
(45) Date of Patent: Mar. 31, 2026

(54) LIQUID AGENT APPLICATION APPARATUS

(71) Applicant: FUJI CORPORATION, Chiryu (JP)

(72) Inventors: Kenta Narumi, Chiryu (JP); Hiroaki Ina, Chiryu (JP); Shotaro Minakawa, Okazaki (JP)

(73) Assignee: FUJI CORPORATION, Chiryu (JP)

(*) Notice: Subject to any disclaimer, the term of this patent is extended or adjusted under 35 U.S.C. 154(b) by 517 days.

(21) Appl. No.: 18/004,256

(22) PCT Filed: Jul. 9, 2020

(86) PCT No.: PCT/JP2020/026785
§ 371 (c)(1),
(2) Date: Jan. 4, 2023

(87) PCT Pub. No.: WO2022/009359
PCT Pub. Date: Jan. 13, 2022

(65) Prior Publication Data
US 2023/0264224 A1 Aug. 24, 2023

(51) Int. Cl.
*B05C 5/02* (2006.01)

(52) U.S. Cl.
CPC .................................. *B05C 5/0229* (2013.01)

(58) Field of Classification Search
USPC ......................... 118/300, 305, 679–682, 684
See application file for complete search history.

(56) References Cited

U.S. PATENT DOCUMENTS

| | | | | |
|---|---|---|---|---|
| 6,139,639 A * | 10/2000 | Kitamura | B05C 5/0254 | 118/DIG. 2 |
| 6,715,506 B1 * | 4/2004 | Ikushima | G01F 11/021 | 141/26 |
| 2008/0248193 A1 * | 10/2008 | Nakatsuji | B05C 11/1002 | 427/407.1 |

FOREIGN PATENT DOCUMENTS

| | | |
|---|---|---|
| JP | 11-262713 A | 9/1999 |
| JP | 2001-239197 A | 9/2001 |

OTHER PUBLICATIONS

International Search Report issued Sep. 24, 2020 in PCT/JP2020/026785 filed on Jul. 9, 2020, 2 pages.

* cited by examiner

*Primary Examiner* — Yewebdar T Tadesse
(74) *Attorney, Agent, or Firm* — Oblon, McClelland, Maier & Neustadt, L.L.P.

(57) ABSTRACT

A liquid agent application apparatus includes an application nozzle that is movable up and down and in a horizontal plane direction with respect to a board, an application valve that switch between a first state in which supply of a liquid agent to the application nozzle is performed and a second state in which the supply of the liquid agent to the application nozzle is stopped, and a control device that controls these. The control device performs control such that the application nozzle is lowered, the application valve is switched to the second state by standing by a predetermined time after switching the application valve to the first state at a predetermined supply start timing, and the application nozzle is raised after a timing at which a tip end of the application nozzle reaches a lowering end and the application valve is switched to the second state.

5 Claims, 6 Drawing Sheets

LIQUID AGENT APPLICATION APPARATUS

TECHNICAL FIELD

The present specification discloses a liquid agent application apparatus.

BACKGROUND ART

Conventionally, a liquid agent application apparatus including an application nozzle and an application valve is known. The application nozzle is movable up and down and is relatively movable in a horizontal plane direction about a board. The application valve performs supply and supply stop of a liquid agent to the application nozzle by an open/close operation. In Patent Literature 1, in such a liquid agent application apparatus, a timing (valve-on timing) at which an application valve is open is retroactive from a timing at which a tip end of an application nozzle applies a liquid agent at a lowering end to be always the same timing.

PATENT LITERATURE

Patent Literature 1: JP-A-11-262713

BRIEF SUMMARY

Technical Problem

However, as described above, a valve-on timing is always set to the same timing retroactively from the timing at which a liquid agent is applied, and thus, trouble could occur. For example, when a time during which an application valve is turned on is long, a waiting time during which a tip end of an application nozzle stays at a lowering end may occur, which can cause an increase in tact (process operation time). Further, the liquid agent could leak from the tip end of the application nozzle due to influence of a residual pressure in the application nozzle after the application valve is turned off from on.

The present disclosure is made to solve such a problem, and it is a main object of the present disclosure to remove trouble occurring when a valve-on timing of an application valve is constant.

Solution to Problem

A liquid agent application apparatus according to the present disclosure employs the following means in order to achieve the main object described above.

A liquid agent application apparatus according to the present disclosure includes an application nozzle configured to move up and down with respect to a board and relatively move in a horizontal plane direction with respect to the board, an application valve configured to switch between a first state in which supply of a liquid agent to the application nozzle is performed and a second state in which the supply of the liquid agent to the application nozzle is stopped, and a control device configured to perform control such that the application nozzle is lowered from above the board toward a predetermined position on the board, perform control such that the application valve is switched to the second state by standing by a predetermined time after switching the application valve to the first state at a predetermined supply start timing, and perform control such that the application nozzle is raised after a timing at which a tip end of the application nozzle reaches a lowering end and the application valve is switched to the second state, in which the supply start timing is arbitrarily set by an operator and/or the control device.

In the liquid agent application apparatus, a supply start timing is arbitrarily set by an operator and/or a control device. Accordingly, it is possible to remove trouble occurring when a supply start timing of an application valve is constant. The liquid agent includes, for example, a viscous fluid.

DESCRIPTION OF EMBODIMENTS

Figure 1:
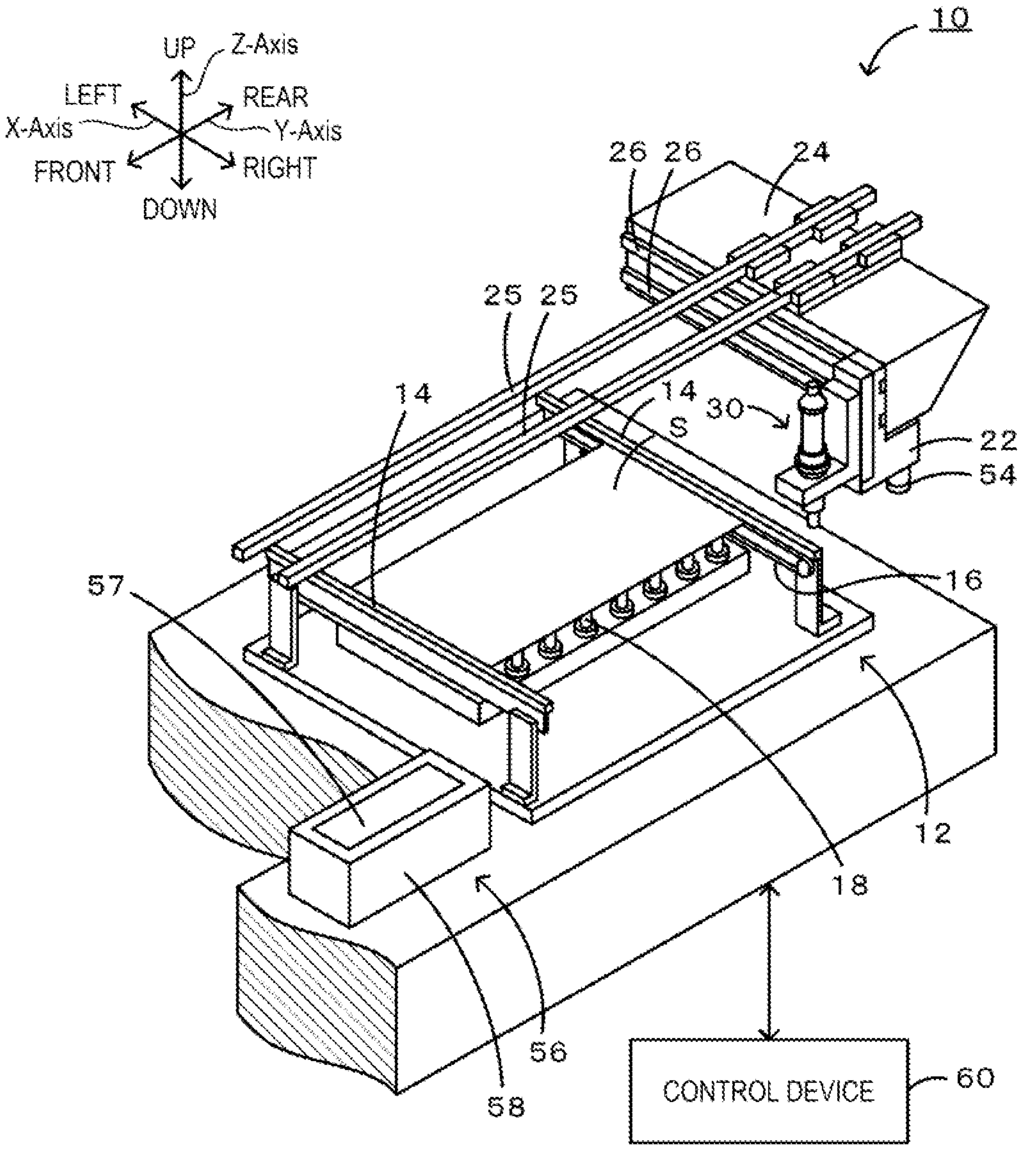
FIG. 1 is a perspective view of a principal portion of liquid agent application apparatus 10.
Figure 2:
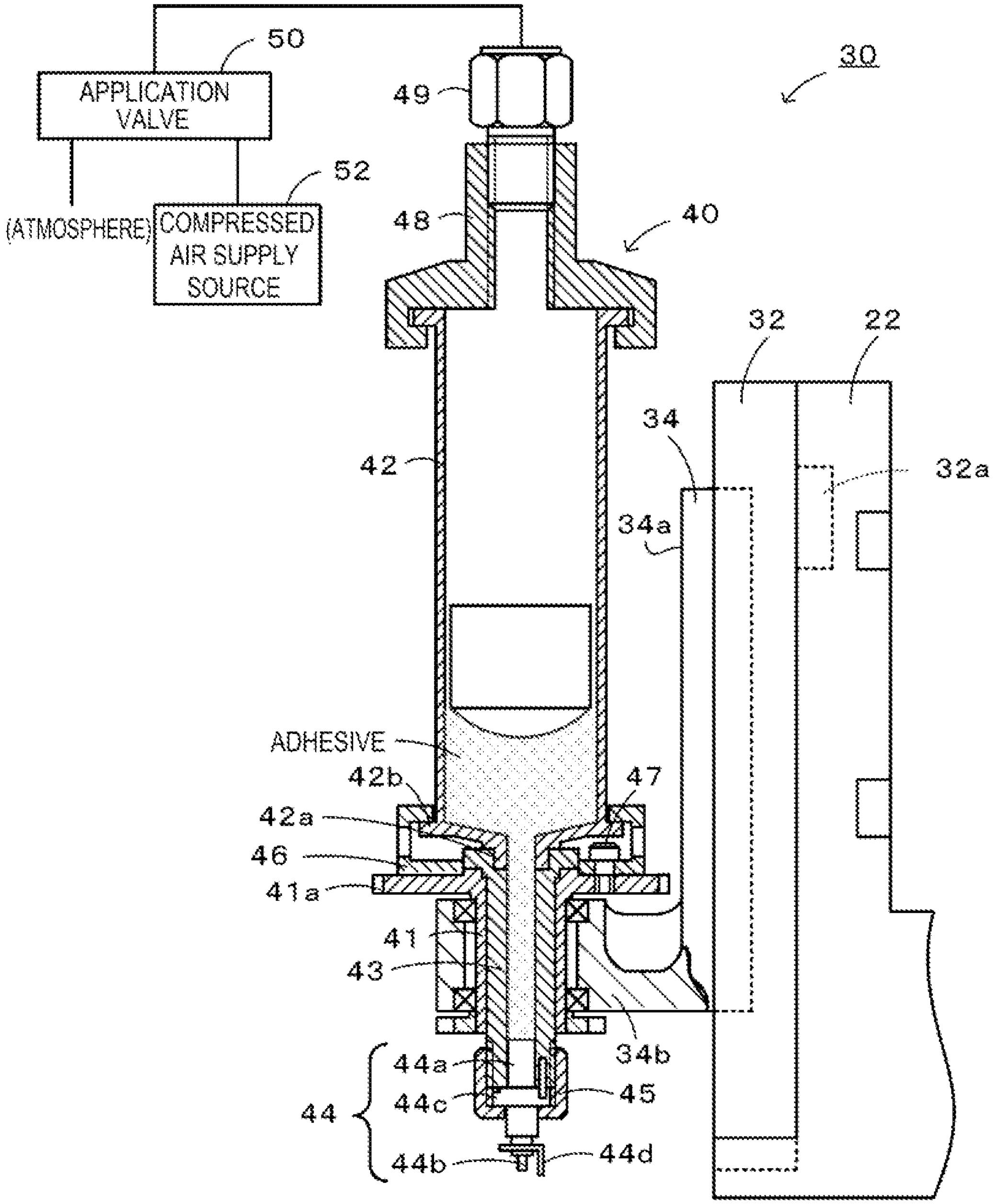
FIG. 2 is a partial cross-sectional view illustrating a schematic configuration of application head 30.
Figure 3:
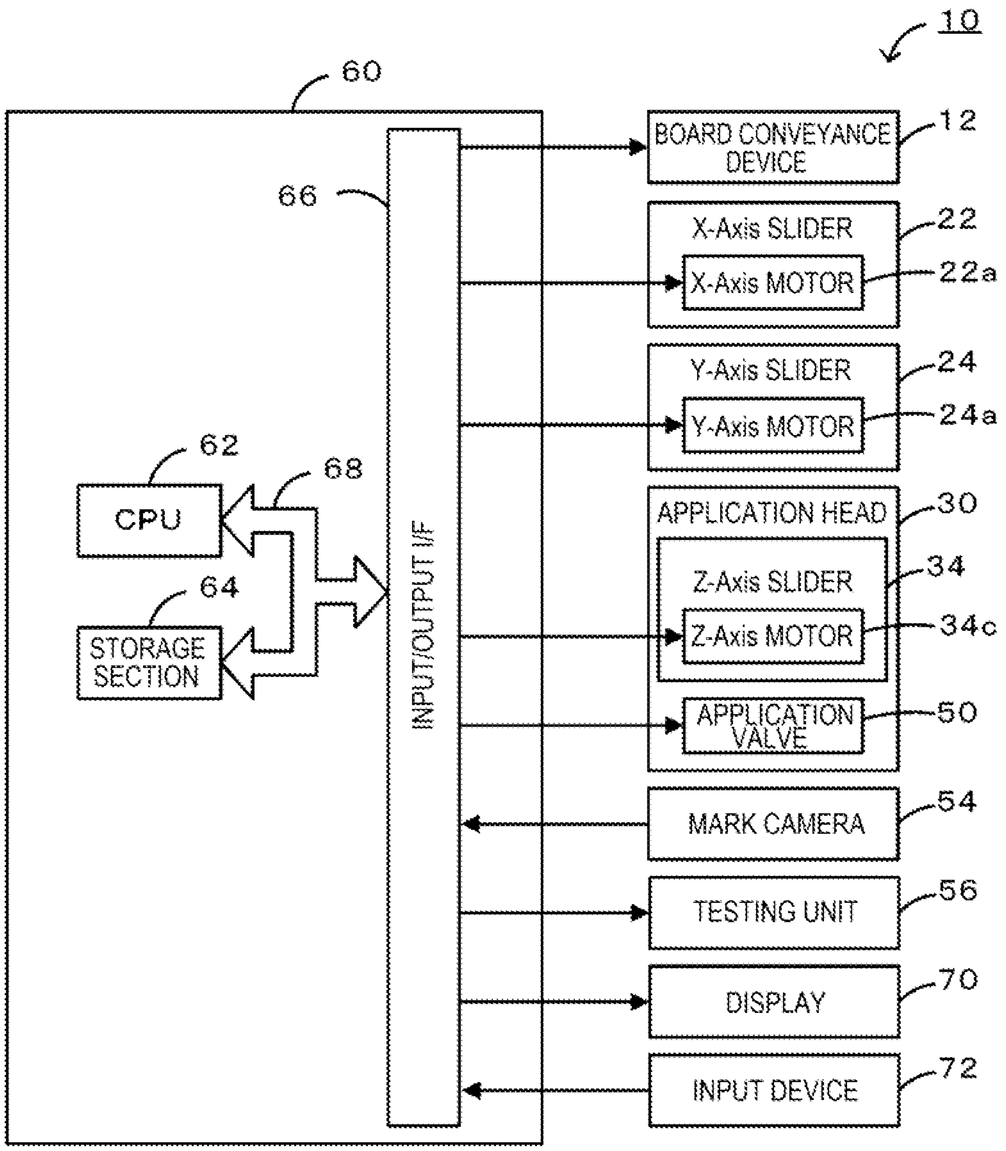
FIG. 3 is a block diagram illustrating a configuration related to control of liquid agent application apparatus 10.

Preferred embodiments of a liquid agent application apparatus of the present disclosure will be described below with reference to the drawings. FIG. 1 is a perspective view of a principal portion of liquid agent application apparatus 10, FIG. 2 is a partial cross-sectional view illustrating a schematic configuration of application head 30, and FIG. 3 is a block diagram illustrating a configuration related to control of liquid agent application apparatus 10. In the present embodiment, it is assumed that a left-right direction (X-axis), a front-rear direction (Y-axis), and an up-down direction (Z-axis) are as illustrated in FIG. 1.

Liquid agent application apparatus 10 includes board conveyance device 12, application head 30, mark camera 54, and control device 60.

Board conveyance device 12 is a device for conveying and holding board S. Board conveyance device 12 includes support plates 14 and 14, and conveyor belts 16 and 16 (only one of which is illustrated in FIG. 1). Support plates 14 and 14 are members extending in a left-right direction and are provided to be separated from each other in the front and rear in FIG. 1. Conveyor belts 16 and 16 are stretched to a drive wheel and a driven wheel provided on the left and right of the support plates 14 and 14 in an endless shape. Board S is mounted on upper surfaces of a pair of conveyor belts 16 and 16 and is conveyed from the left to the right. Board S can be supported from a rear surface side by many upright support pins 18. Therefore, board conveyance device 12 also serves as a board support device.

Application head 30 is detachably attached to a front surface of X-axis slider 22. X-axis slider 22 is attached to a front surface of Y-axis slider 24. Y-axis slider 24 is slidably attached to a pair of left and right guide rails 25 and 25 extending in a front-rear direction. A pair of up-down guide rails 26 and 26 extending in a left-right direction are provided on a front surface of Y-axis slider 24. X-axis slider 22 is slidably attached to guide rails 26 and 26. Application head 30 moves in the left-right direction as X-axis slider 22 moves in the left-right direction, and moves in the front-rear direction as Y-axis slider 24 moves in the front-rear direction. X-axis and Y-axis sliders 22 and 24 are respectively driven by X-axis and Y-axis motors 22*a* and 24*a* (refer to FIG. 3).

As illustrated in FIG. 2, application head 30 includes holding member 32, Z-axis slider 34, head main body 40, and application valve 50. Holding member 32 is a plate-shaped member including attaching/detaching device 32*a* on a rear face and is detachably attached to a front surface of X-axis slider 22 via attaching/detaching device 32*a*. Z-axis slider 34 is an L-shaped member including slider main body 34*a* and arm 34*b*, and slider main body 34*a* is slidably attached to a front surface of holding member 32 in an up-down direction. Z-axis slider 34 is raised and lowered by Z-axis motor 34*c* (refer to FIG. 3). Head main body 40 will be described below. Application valve 50 is an electromagnetic direction switching valve and allows compressed air supply source 52 and the atmosphere to selectively communicate with syringe 42 of head main body 40.

Head main body 40 includes sleeve 41, syringe 42, adapter 43, application nozzle 44, and engagement member 46. Sleeve 41 is rotatably attached to a hole penetrating arm 34*b* in the up-down direction via a bearing. External gear 41*a* is integrated with an upper end of sleeve 41. Syringe 42 is a bottomed tubular member, and an adhesive (glue) that is a viscous fluid is housed therein. Short tube 42*a* penetrating in the up-down direction protrudes in the center of a bottom surface of syringe 42. Adapter 43 is a tubular member and is fixed to short tube 42*a* of syringe 42. Adapter 43 is inserted into sleeve 41 such that a lower end of adapter 43 is exposed from a lower end of sleeve 41. Application nozzle 44 is configured such that one needle 44*b* is fixed to a tip end of tubular holder 44*a*. Application nozzle 44 is fastened to nut 45 in a state of being inserted into a lower end of adapter 43. Specifically, flange 44*c* provided on an outer circumferential surface of holder 44*a* is interposed between nut 45 and a lower end of adapter 43, and thereby, application nozzle 44 is detachably attached to the lower end of adapter 43. Stopper 44*d* is provided over holder 44*a*. Stopper 44*d* comes into contact with board S when an adhesive is applied such that a certain gap is formed between a tip end of needle 44*b* and board S. The gap is set such that the adhesive ejected from the tip end of needle 44*b* is applied to board S in a predetermined shape. When stopper 44*d* comes into contact with board S, the tip end of application nozzle 44 (that is, a tip end of needle 44*b*) reaches a lowering end. Engagement member 46 is fastened to external gear 41*a* of sleeve 41 by bolt 47 in a state where flange 42*b* provided below syringe 42 is pressurized from the top. As a result, sleeve 41 and syringe 42 are fixed via engagement member 46. Cap 48 is placed on an upper opening of syringe 42.

Connection metal fitting 49 is screwed to cap 48, and application valve 50 and compressed air supply source 52 are connected to the connection metal fitting 49 in this order. Application valve 50 is set to either on (a first state) or off (a second state). When application valve 50 is turned on, compressed air flows into syringe 42 from compressed air supply source 52, and thereby an adhesive is supplied to needle 44*b*. When application valve 50 is turned off, the atmosphere flows into syringe 42, and thereby, supply of an adhesive to needle 44*b* is stopped.

In FIG. 2, a case where application nozzle 44 including one needle 44*b* is attached to adapter 43 is exemplified, but in this case, external gear 41*a* is held so as not to rotate. As a result, head main body 40 including application nozzle 44 does not rotate about Z-axis slider 34. Meanwhile, when an application nozzle including multiple (for example, two) needles is attached to adapter 43, external gear 41*a* rotates by using a rotary motor (not illustrated), and a direction in which the two needles are arranged can be changed.

Mark camera 54 is provided on a lower surface of X-axis slider 22. Mark camera 54 moves in the XY direction according to movement of application head 30. Mark camera 54 images a reference mark attached to board S or images the adhesive applied to board S within a lower camera field of view, and outputs the captured image to control device 60.

Testing unit 56 includes paper medium 57 used for testing and is provided in front of board conveyance device 12. Paper medium 57 is wound from a roll paper by a winding device on a winding roller, and thereby, a new surface for testing is exposed from an upper opening of housing 58. Paper medium 57 is prepared such that a degree of permeation or the like of an adhesive is substantially the same as in board S and is adjusted to have the same height as a surface of board S. Paper medium 57 is used to inspect an application state of the adhesive ejected from needle 44*b* of application head 30.

As illustrated in FIG. 3, control device 60 includes CPU 62, storage section 64 (ROM, RAM, HDD, or the like), an input/output interface 66, and the like, which are connected to each other via bus 68. Control device 60 outputs signals to board conveyance device 12, X-axis motor 22*a* for driving X-axis slider 22, Y-axis motor 24*a* for driving Y-axis slider 24, Z-axis motor 34*c* for driving Z-axis slider 34, application valve 50, mark camera 54, testing unit 56, and display 70. In addition, control device 60 receives a captured image from mark camera 54 and a signal from input device 72. Input device 72 includes a keyboard and a mouse. Position sensors (not illustrated) are equipped in respective sliders 22, 24, and 34, and control device 60 controls motors 22*a*, 24*a*, and 34*c* of each of sliders 22, 24, and 34 while receiving position information from the position sensors.

Figure 4:
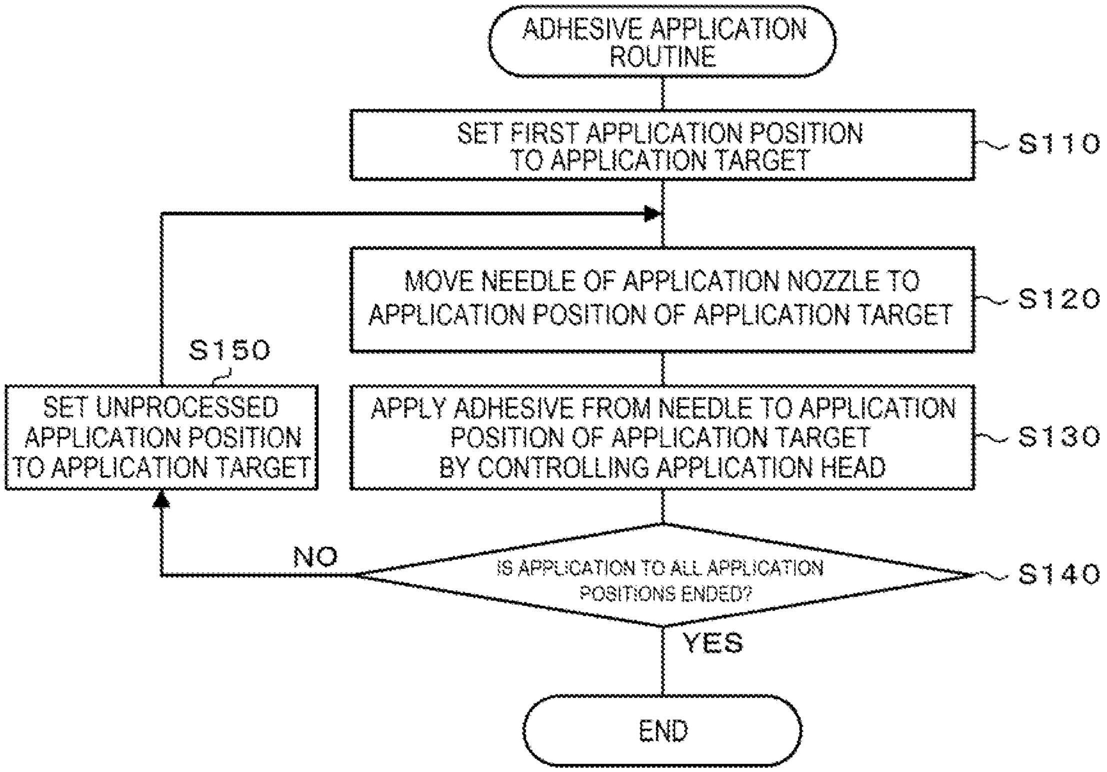
FIG. 4 is a flowchart of an adhesive application routine.

Next, an operation of liquid agent application apparatus 10 according to the present embodiment which is configured as described above, particularly, an adhesive application routine on board S will be described. FIG. 4 is a flowchart illustrating an example of an adhesive application routine performed by CPU 62 of control device 60. This routine is stored in storage section 64 of control device 60 and performed in a state where preparation for an application process is completed, such as a state where board S is conveyed to a predetermined position by board conveyance device 12 to be held therein. Before executing this routine, it is assumed that control device 60 acquires a job for determining in what order an adhesive is applied to multiple application positions of board S. The application position is set to correspond to a position on which a component is mounted.

When an adhesive application routine starts, CPU 62 first sets a first application position to an application target in step S110. Subsequently, in step S120, CPU 62 moves needle 44*b* of application nozzle 44 to the application position of the application target. Specifically, CPU 62 causes X-axis motor 22*a* and Y-axis motor 24*a* to operate X-axis slider 22 and Y-axis slider 24, thereby positioning needle 44*b* directly above the application position of the application target. At this time, a height of a tip end of needle 44*b* is set to a height (standby position) at which needle 44*b* does not collide with surrounding members or the like when moving in XY directions.

Subsequently, in step S130, CPU 62 causes application head 30 to apply an adhesive from needle 44*b* to the application position of the application target. Specifically, CPU 62 causes Z-axis motor 34*c* to lower needle 44*b* on Z-axis slider 34 from the standby position to a lowering end and then raise needle 44*b* from the lowering end to the standby position. At the same time, CPU 62 switches application valve 50 from off to on at a predetermined valve-on timing (supply start timing) to supply a liquid agent to needle 44*b*, and thereafter switches application valve 50 from on to off by standing by for a predetermined application time (time for applying pressure to an adhesive with compressed air) to elapse to stop supply of the liquid agent to needle 44*b*. The valve-on timing is stored in storage section 64 and is read by CPU 62 to be used. Further, after the tip end of needle 44*b* reaches the lowering end and application valve 50 is switched off, CPU 62 causes Z-axis motor 34*c* to raise needle 44*b*. The valve-on timing is arbitrarily set by an operator as described below. The set valve-on timing is applied to all application positions of one board S.

Subsequently, in step S140, CPU 62 determines whether application of an adhesive to all application positions is completed. When it is determined in S140 that the processing is not completed, CPU 62 sets an unprocessed application position to an application target (S150) and performs processing after S120 again. Meanwhile, when the application of the adhesive to all the application positions is completed in S140, CPU 62 ends the present routine.

Next, a case where an operator sets the valve-on timing will be described.

Figure 5:
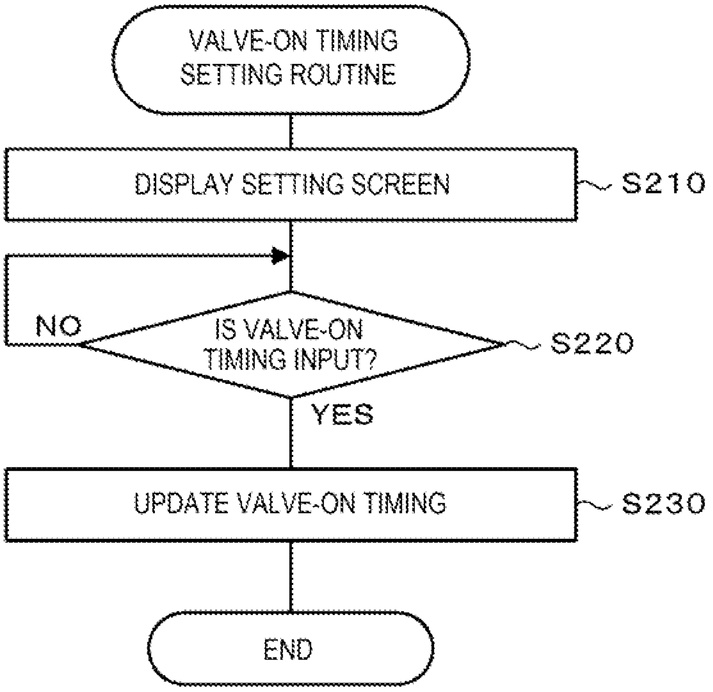
FIG. 5 is a flowchart illustrating an example of a valve-on-timing setting routine.

FIG. 5 is a flowchart illustrating an example of a valve-on-timing setting routine. This routine is stored in storage section 64 of control device 60 and starts when the operator instructs calling of a setting screen from input device 72. In step S210, CPU 62 first displays the setting screen on display 70. The operator arbitrarily sets the valve-on timing on the setting screen by using input device 72. The valve-on timing is set by a height [mm] of a lowering end of needle 44*b*.

CPU 62 determines whether the valve-on timing is input (S220) and stands by as it is when the valve-on timing is not input. Meanwhile, when the valve-on timing is input in S 220, CPU 62 updates a previous valve-on timing stored in storage section 64 to a valve timing input this time (S230) and ends the present routine.

Figure 6:
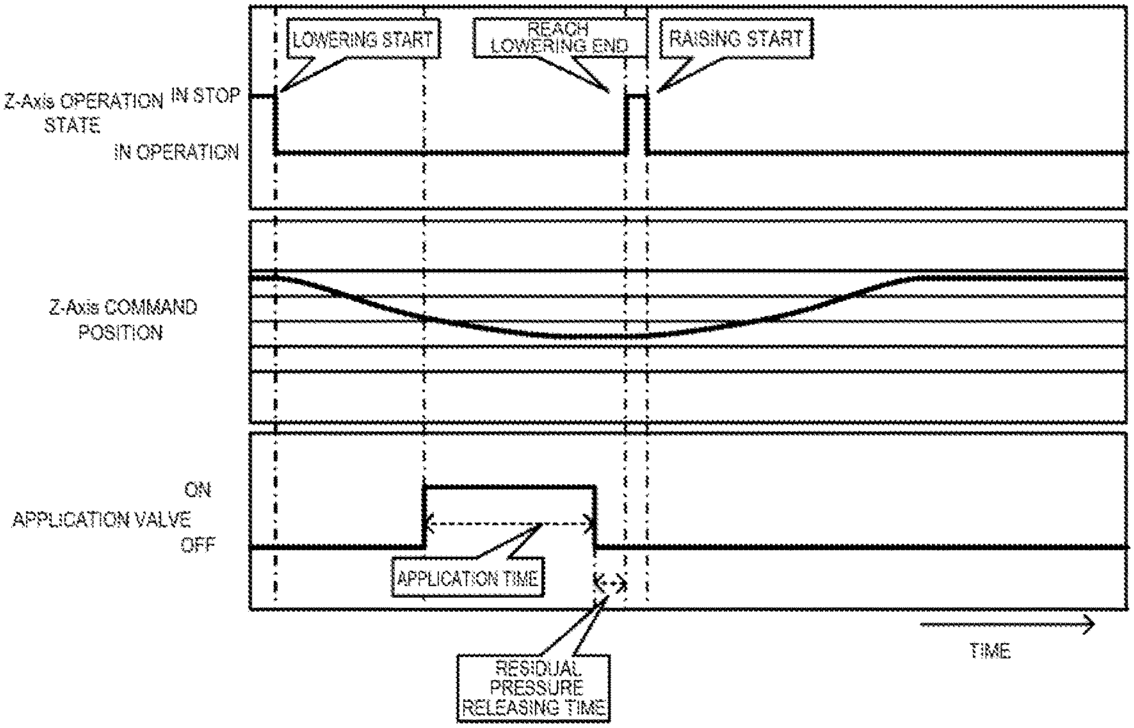
FIG. 6 is a time chart illustrating an example of an operation state of application head 30.

Next, a relationship between the valve-on timing and tact will be described. FIG. 6 is a time chart illustrating an example of an operation state of application head 30 that performs the processing of S130. Here, the valve-on timing is set to a timing at which needle 44*b* reaches a predetermined height (for example, 4 mm or 5 mm) from a lowering end after lowering of application head 30 starts. The height of needle 44*b* may be obtained based on a Z-axis command position or may be obtained based on a detection signal of an encoder (not illustrated) attached to application head 30. After application valve 50 is turned on, the application valve stands by for a predetermined application time to elapse. Until the application time elapses, compressed air is continuously supplied to syringe 42 of application head 30. The predetermined application time is set based on an application diameter, viscosity, and the like of an adhesive. For example, when an adhesive with a low viscosity is used, the application time is set to be short, whereas when an adhesive with a high viscosity is used, the application time is set to be long. FIG. 6 illustrates an example in which the application time is set to be relatively short. In this example, the valve-on timing is set such that the application time elapses before a tip end of needle 44*b* of application nozzle 44 reaches a lowering end. Accordingly, there is a certain amount of time until needle 44*b* reaches the lowering end (residual pressure releasing time) after the application time ends and application valve 50 is turned off. Since a residual pressure in syringe 42 is released by using this time, it is possible to prevent liquid from leaking after needle 44*b* is raised. In addition, since needle 44*b* can promptly start to be raised after needle 44*b* reaches a lowering end, the tact is appropriate.

Figure 7:
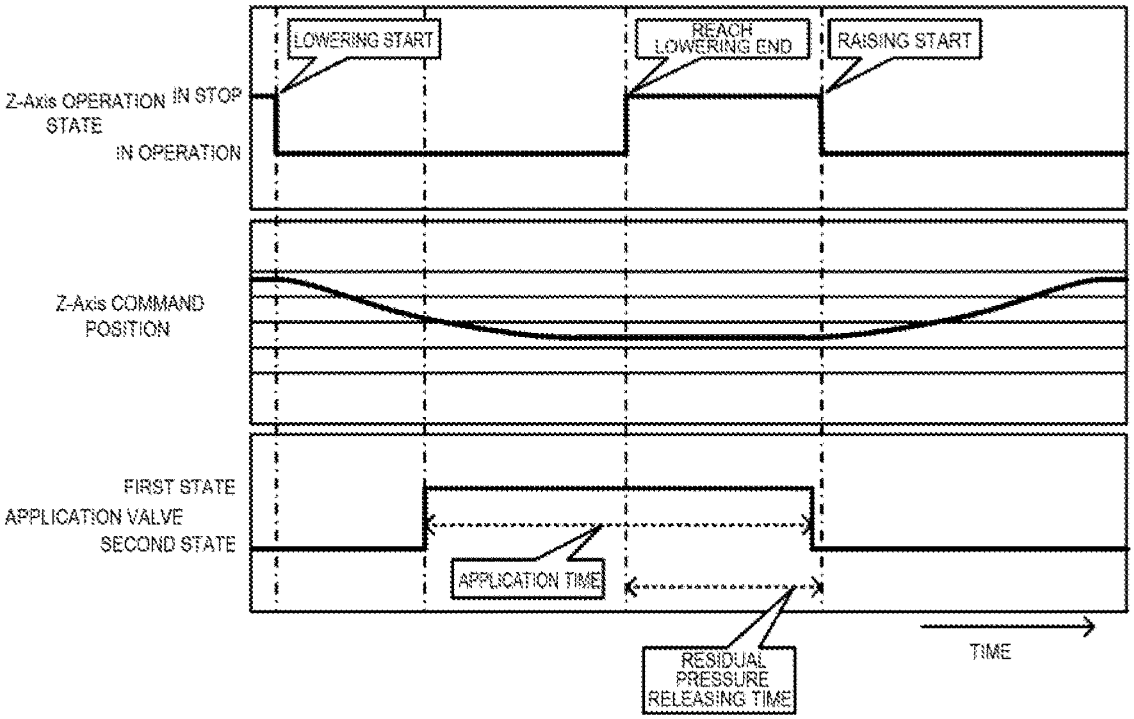
FIG. 7 is a time chart illustrating an example of an operation state of application head 30.

FIG. 7 is also a time chart illustrating the example of the operation state of application head 30 that performs the processing of S130. Here, the valve-on timing is set to the same timing as in FIG. 6, but the application time is set to be longer than in FIG. 6. Specifically, the application time continues even after needle 44*b* reaches the lowering end. Accordingly, needle 44*b* stands by at a lowering end until the application time ends after needle 44*b* reaches the lowering end. That is, the time (standby time at the lowering end) when needle 44*b* starts to be raised after a tip end of needle 44*b* reaches the lowering end is relatively long. As a result, tact increases and productivity decreases.

Figure 8:
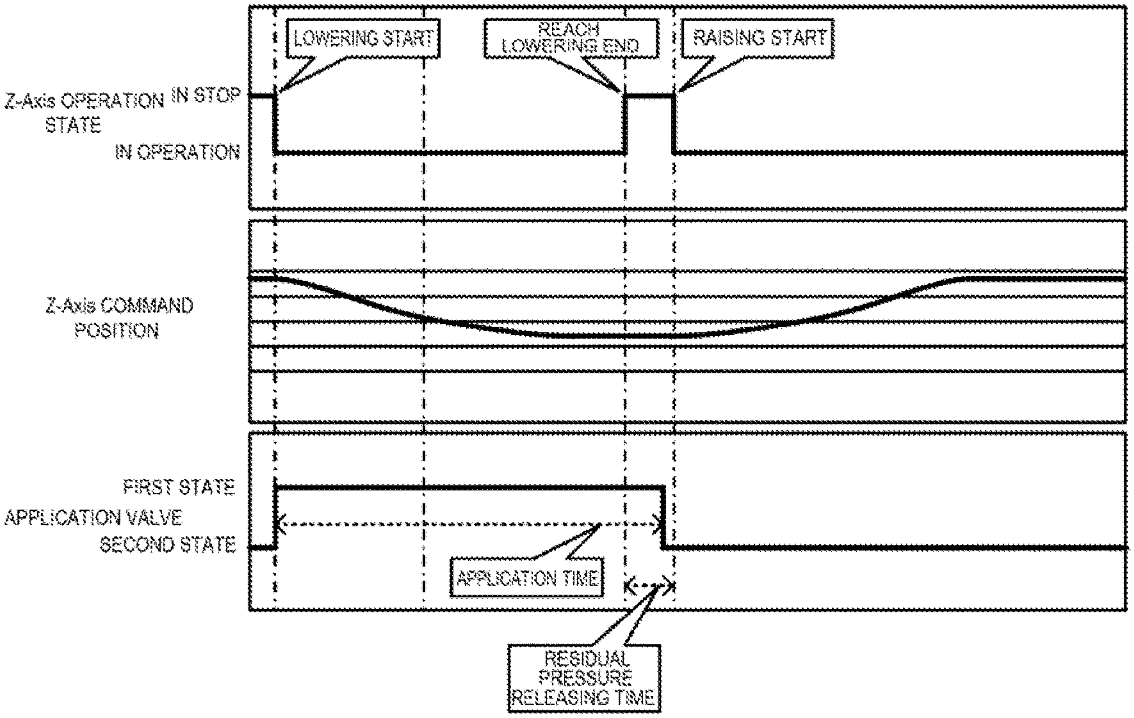
FIG. 8 is a time chart illustrating an example of an operation state of application head 30.

In a case where the application time is long as illustrated in FIG. 7, it is possible to prevent tact from increasing as an operator sets the valve-on timing early. FIG. 8 is a time chart illustrating an example of an operation state of application head 30 that performs the processing of S130, in which the application time is set to the same length as in FIG. 7, but the valve-on timing is set earlier than in FIG. 7. In FIG. 8, the valve-on timing is set to a point in time when needle 44*b* starts to be lowered. In other words, the valve-on timing is set such that a standby time at a lowering end approaches zero as compared with FIG. 7. As a result, it is possible to prevent tact from increasing as compared with FIG. 7.

In the present embodiment described above, the valve-on timing is arbitrarily set by an operator. Accordingly, it is possible to remove trouble occurring when the valve-on timing is constant.

In addition, in FIG. 6, the valve-on timing is set such that an application time elapses before a tip end of application nozzle 44 reaches a lowering end. Thereby, a tip end of application valve 50 can stay at the lowering end for a while (residual pressure releasing time) after application valve 50 is turned off. Accordingly, the residual pressure in application nozzle 44 decreases during this time, and thus, it is possible to prevent liquid from leaking after application nozzle 44 is raised.

Further, in FIG. 8, the valve-on timing is set such that a time period, from the time when the tip end of application nozzle 44 reaches a lowering end to the time when application nozzle 44 starts to be raised, approaches zero. Thereby, it is possible to shorten a standby time when the tip end of application nozzle 44 stay at a lowering end. Accordingly, it is possible to prevent tact from increasing.

Of course, the present invention is not limited in any way to the embodiment described above and can be implemented in various forms without departing from the technical scope thereof.

For example, in the above embodiment, the valve-on timing is set by an operator but may be set by control device 60. For example, control device 60 stores in advance a correspondence relationship in which the type of an adhesive and the valve-on timing in storage section 64 are associated with each other and may set the valve-on timing from the correspondence relationship based on the type of an adhesive to be used. Since characteristics (for example, viscosity or the like) of an adhesive differ according to the type of the adhesive, the valve-on timings suitable for the type of the adhesive are associated with each other in advance and stored in storage section 64. Accordingly, it is possible to set a valve-on timing suitable for the type of an adhesive.

Alternatively, in setting the valve-on timing, control device 60 may sequentially adopt multiple predetermined temporary valve-on timings to determine an application state of an adhesive by application nozzle 44 and store the temporary valve-on timings at which the application state of the adhesive is appropriate in storage section 64 as the valve-on timings. The temporary valve-on timing may be set to, for example, a standby position in each 1 [mm] from a lowering end of needle 44*b*.

Determination of the application state of the adhesive can be made by applying an adhesive to paper medium 57 of testing unit 56. For determination of the application state, for example, an image of an adhesive applied to paper medium 57 is captured by mark camera 54, and whether the application state is good or bad can be determined based on a size of a diameter of the adhesive, a state of a satellite (droplets after the adhesive is scattered), and the like from the image. Accordingly, the valve-on timing is set after it is checked by testing that the application state of the adhesive is suitable, and thus, trouble caused by the valve-on timing after the setting is hard to occur.

In the above embodiment, liquid agent application apparatus 10 is exemplified as an example of the liquid agent application apparatus of the present disclosure, but a structure may be used in which a work head used for component mounting of a commonly known component mounting device (refer to, for example, JP-A-2016-115910) is exchanged with application head 30.

In the above embodiment, the valve-on timing is applied to all application positions of one board S but is not limited thereto in particular. For example, in a case where an adhesive is first applied to one board S by application nozzle 44 having a nozzle diameter of a [mm] and the adhesive is applied by exchanging the application nozzle with application nozzle 44 having a nozzle diameter of b [mm] on the way, the valve-on timing may be set for each nozzle diameter to apply the valve-on timing corresponding to the nozzle diameter.

Alternatively, the valve-on timing may be set for each application position of one board S to apply the valve timing corresponding to an application position.

In the above embodiment, the valve-on timing is set by a valve-on-timing setting routine but is not limited thereto in particular. For example, the valve-on timing may be set by a setting file that can be edited by an operator in a text file and may be transferred to storage section 64 of control device 60 by a file transfer protocol to be updated.

In the above embodiment, the valve-on timing is set by a height [mm] from a lowering end of needle 44*b* but is not limited thereto in particular.

For example, the valve-on timing may be set to a time [msec] that is retroactive by an application time (or application time+a) from an expected time when needle 44*b* reaches a lowering end.

In this case, it is preferable to set the expected time such that a time period from the time when needle 44*b* reaches a lowering end to the time when needle 44*b* is raised is as short as possible (that is, so as to be zero or approach to zero).

In the above embodiment, an adhesive is exemplified as a viscous fluid but is not limited thereto in particular, and, for example, cream solder or conductive paste may be used therefor.

The liquid agent application apparatus according to the present disclosure may be configured as follows.

In the liquid agent application apparatus according to the present disclosure, the supply start timing may be set such that a time period, from a time when the tip end of the application nozzle reaches the lowering end to a time when the application valve starts to be raised, is zero or approaches zero. Accordingly, a standby time during which the tip end of the application nozzle stays at the lowering end can be shortened as much as possible, and thus, it is possible to prevent tact from increasing.

In the liquid agent application apparatus according to the present disclosure, the supply start timing may be set such that the predetermined time elapses before the tip end of the application nozzle reaches the lowering end. Accordingly, the tip end of the application valve can stay at the lowering end for a while after supply of a liquid agent to the application nozzle is stopped, and thus, a residual pressure in the application nozzle decreases during that time, and a liquid agent can be prevented from leaking from the tip end of the application nozzle.

In the liquid agent application apparatus of the present disclosure, the supply start timing may be set by the control device, the control device may store in advance a correspondence relationship, in which a type of the liquid agent and the supply start timing are associated with each other, in a storage section, and the supply start timing may be set from the correspondence relationship based on the type of the liquid agent to be used. Accordingly, it is possible to set the supply start timing suitable for the type of the liquid agent.

In the liquid agent application apparatus of the present disclosure, the supply start timing may be set by the control device, and the control device may sequentially adopt multiple predetermined temporary supply start timings in setting the supply start timing to determine an application state of the liquid agent by the application nozzle and set the temporary supply start timing at which the application state of the liquid agent is suitable as the supply start timing. Accordingly, the supply start timing is set after it is checked by, for example, testing or the like that the application state of the liquid agent is suitable, and thus, trouble caused by the supply start timing after the setting is hard to occur.

INDUSTRIAL APPLICABILITY

The present disclosure can be applied to a liquid agent application apparatus that applies a liquid agent to a predetermined position of a board.

REFERENCE SIGNS LIST

10 Liquid agent application apparatus, 12 board conveyance device, 14 support plate, 16 conveyor belt, 18 support pin, 22 X-axis slider, 22*a* X-axis motor, 24 Y-axis slider, 24*a* Y-axis motor, 25 guide rail, 26 guide rail, 30 application head, 32 holding member, 32*a* attaching/detaching device, 34 Z-axis slider, 34*a* slider main body, 34*b* arm, 34*c* Z-axis motor, 40 head main body, 41 sleeve, 41*a* external gear, 42 syringe, 42*a* short tube, 42*b* flange, 43 adapter, 44 application nozzle, 44*a* holder, 44*b* needle, 44*c* flange, 44*d* stopper, 45 nut, 46 engagement member, 47 bolt, 48 cap, 49 connection metal fitting, 50 application valve, 52 compressed air supply source, 54 mark camera, 56 testing unit, 57 paper medium, 58 housing, 60 control device, 62 CPU, 64 storage section, 66 input/output interface, 68 bus, 70 display, 72 input device, S board

The invention claimed is:

1. A liquid agent application apparatus comprising:

an application nozzle configured to move up and down with respect to a board and relatively move in a horizontal plane direction with respect to the board:

an application valve configured to switch between a first state in which supply of a liquid agent to the application nozzle is performed and a second state in which the supply of the liquid agent to the application nozzle is stopped; and a control device configured to control the application nozzle and the application valve to:

lower the application nozzle from above the board toward a predetermined position on the board, switch the application valve to the first state at a supply start timing, switch the application valve to the second state after an application time that starts at the supply start timing, and raise the application nozzle after a timing at which a tip end of the application nozzle reaches a lowering end and the application valve is switched to the second state, wherein the supply start timing is set to a time that is retroactive by the application time from an expected time when the tip end reaches the lowering end, the expected time is set such that a time period from the time when the application nozzle reaches the lowering end to the time when the application nozzle is raised is as short as possible.

2. The liquid agent application apparatus according to claim 1, wherein the supply start timing is set such that a time period, from a time when the tip end of the application nozzle reaches the lowering end to a time when the application valve starts to be raised, is zero or approaches zero.

3. The liquid agent application apparatus according to claim 1, wherein the supply start timing is set such that the application time elapses before the tip end of the application nozzle reaches the lowering end.

4. The liquid agent application apparatus according to claim 1, wherein the supply start timing is set by the control device, and the control device stores in advance a correspondence relationship in which a type of the liquid agent and the supply start timing are associated with each other in a storage section, and sets the supply start timing from the correspondence relationship based on the type of the liquid agent to be used.

5. The liquid agent application apparatus according to claim 1, wherein the supply start timing is set by the control device, and the control device sequentially adopts multiple predetermined temporary supply start timings in setting the supply start timing to determine an application state of the liquid agent by the application nozzle and sets the temporary supply start timing at which the application state of the liquid agent is suitable as the supply start timing.

* * * * *